(12) United States Patent
Horne et al.

(10) Patent No.: US 6,462,938 B1
(45) Date of Patent: Oct. 8, 2002

(54) CONNECTING DEVICE

(75) Inventors: Tony Horne, Hampshire (GB); Mark Hutchinson, Hampshire (GB)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/465,712

(22) Filed: Dec. 17, 1999

(30) Foreign Application Priority Data

Dec. 18, 1998 (GB) .............................................. 9828021

(51) Int. Cl.[7] .................................................. G06F 1/16
(52) U.S. Cl. ........................ 361/681; 361/807; 361/814; 455/90; D14/138; 343/702
(58) Field of Search ................................. 361/681, 807, 361/814; 379/433; 455/90, 572, 573; D14/138; 343/702

(56) References Cited

U.S. PATENT DOCUMENTS

| | | | |
|---|---|---|---|
| 4,225,257 | 9/1980 | Andreaggi | .................... 403/24 |
| 4,415,983 | 11/1983 | Lachmann et al. | ......... 364/708 |
| 4,422,728 | 12/1983 | Andreaggi | .................. 350/334 |
| 6,011,699 | * 1/2000 | Murray et al. | .............. 361/814 |

* cited by examiner

*Primary Examiner*—Darren Schuberg
*Assistant Examiner*—Yean-Hsi Chang
(74) *Attorney, Agent, or Firm*—Perman & Green, LLP

(57) ABSTRACT

Portable apparatus comprising a display 4 having an electrical interface 5 with at least one electrical contact 24; a circuit board 2 having an electrical interface with at least one electrical contact 12 for supplying current to the display 4; and a frame 7 for securing the display 4 to the portable apparatus and urging the display contact 24 and circuit board contact 12 together to allow current to flow from the circuit board contact 12 to the display contact 24.

14 Claims, 4 Drawing Sheets

CONNECTING DEVICE

BACKGROUND OF THE INVENTION

The present invention relates to a display retaining and connecting device for portable apparatus and in particular a radiotelephone.

Two of the main objectives during the design of portable electrical equipment are that, first, the equipment should be easy to manufacture and, second, the equipment should be designed within a limited designated space envelope. One element that can be critical for achieving both these objectives is the connecting and retaining of a display to the equipment.

Examples of portable electrical equipment to which this applies are personal organisers, communicators, radiotelephones etc. During the assembly of the equipment the display is first electrically connected to a circuit board. The connection between the display, for example a LCD, and the circuit board, for example a PCB, is typically via a flexible tab type connector. Once the display is connected to the circuit board the display is then fixed within the equipment to prevent damage to the display and the electrical interface.

One commonly used technique for connecting a display to a radiotelephone circuit board is hot bar soldering.

The hot bar soldering technique requires that, first, solder is placed on the circuit board contacts which have been provided to supply current to the display. The display connector (e.g. the flexible tab connector) is placed on top of the circuit board contacts, sandwiching the solder between the flexible tab connector contacts and the circuit board contacts. A heating element (i.e. a hot bar) is then brought down on top of the flexible tab connector contacts. The heat from the hot bar is conducted through the flexible tab connector and contacts causing the solder to flow and electrically bond the flexible tab connector contacts with the circuit board contacts. Mechanical support is provided on the opposite side of the circuit board to prevent the hot bar damaging the circuit board when the hot bar is brought down on the flexible tab connector.

Another similar technique is heat bonding. The method of connecting the display connector to the circuit board is the same as for hot bar soldering. However, instead of using solder a conductive bonding material is used which is electrically conductive in only one axis—between the circuit board and the flexible tab connector.

These techniques, however, increase the complexity of the radiotelephone manufacturing process. The radiotelephone circuit board which, in use, provides current to the display typically has single sided placement of surface mounted components mounted on the opposite (i.e. second) side of the circuit board to the display. This allows the first side of the circuit board to be used for other purposes, for example placing touch sensitive switches for key selections and mounting the display. Therefore, during component placement the circuit board will move along the production line with the second surface facing upward to allow the surface mounted components to be connected to the circuit board. However, as the display has to be soldered to the opposite side of the circuit board to that of the components the circuit board has to be rotated onto its other side when connecting the display to the circuit board. Typically this requires that the hot bar soldering or heat bonding be performed off the production line at a separate station. This is time consuming and inefficient.

These techniques also increase the complexity of replacing a display. This may be necessary if, for example, the display is faulty.

It is also necessary for the display to be soldered to the circuit board at a separate station as typically the display can not withstand the temperatures of the re-flow ovens used for soldering the surface mounted components to the circuit board.

Further as these techniques require mechanical support on the underside of the circuit board, the side to which surface mounted devices are attached, this requires an area of unpopulated circuit board. This is wasteful of circuit board space, which can increase the overall size of the radiotelephone.

A third technique for connecting the display to the circuit board is the use of elastomeric connectors, commonly known as zebra strips. An elastomeric connector comprises an element of conductive columns. The elastomeric connector is placed between the display and circuit board contacts. The contacts are then clamped together. The connector is orientated between the display and circuit board contacts such that the conductive columns electrically bond the display and circuit board contacts. However, the contacts need to be mounted on stiff co-planer surfaces to allow the contacts to be clamped together. Further, as the number of contacts increases so increases the required clamping pressure. Therefore, for large numbers of contacts, which are typically encountered with LCD displays, elastomeric connectors can be unreliable.

Once the display has been connected to the circuit board the display is then secured to the radiotelephone to help prevent damage to the display and electrical interface. Typically, this is done by means of a metal retainer with a rubber gasket sandwiched between the LCD and metal retainer. The purpose of the rubber gasket it to absorb shock. This extra stage further increases complexity of the manufacturing process. The use of the gasket can also increase the size and cost of the radiotelephone.

SUMMARY OF THE INVENTION

In accordance with one aspect of the present invention there is provided a portable apparatus having a display retaining and connecting arrangement, the arrangement comprising a display having an electrical interface with at least one electrical contact; a circuit board having an electrical interface with at least one electrical contact for supplying current to the display; and a frame for securing the display to the portable apparatus and for urging the display contact and circuit board contact together to allow current to flow from the circuit board contact to the display contact.

This provides the advantage that the display can be attached and connected to the portable apparatus in one operation that can be performed on the production line. As extra mechanical support is not required on the circuit board during the manufacturing process extra space is available on the circuit board for components or conversely the circuit board can be made smaller.

Preferably the frame has a first section for securing the display to the portable apparatus and a second section for urging the display contacts and circuit board contacts together.

The second section will typically comprise a resilient element. Preferably the resilient element has a plurality of resilient fingers. A resilient finger is typically provided for each display contact thereby individually urging a display and circuit board contact together.

Preferably the first section is resiliently biased against the display to allow absorption of shock.

This avoids the requirement for an extra rubber gasket, which can result in a reduction in cost and size of the portable apparatus.

The frame can be pivotally mounted to the portable apparatus to allow movement between an open position and a closed position such that when the frame is in the open position the display can be positioned on or in the portable apparatus and when the frame is in the closed position the display can be secured to the portable apparatus and the display contact and circuit board contact can be urged together.

Further the portable apparatus or the frame can have retaining means for retaining the frame in the closed position.

Preferably the portable apparatus further comprises a speaker having an electrical contact, the frame being capable of securing the speaker to the portable apparatus and urging the speaker contact and a circuit board contact together to allow current to flow from the circuit board contact to the speaker contact.

Preferably the portable apparatus is a radiotelephone.

In accordance with a second aspect of the present invention there is provided a frame for mounting to a portable apparatus for retaining and electrically connecting a display to the portable apparatus, the frame comprising a first section for securing the display to the portable apparatus and a second section for urging together electrical contacts of the display and electrical contacts of portable apparatus together to allow current to flow from the portable apparatus contacts to the display contacts.

In accordance with a third aspect of the present invention there is provided a portable apparatus comprising a display having an electrical interface with at least one electrical contact; a circuit board having an electrical interface with at least one electrical contact for supplying current to the display; and a frame for urging the display contact and circuit board contact together to allow current to flow from the circuit board contact to the display contact.

In accordance with a fourth aspect of the present invention there is provided a portable apparatus comprising a display having an electrical interface with at least one electrical contact; a circuit board having an electrical interface with at least one electrical contact for supplying current to the display; and a frame having a section which, in use, is resiliently biased against the display to allow absorption of shock and for securing the display to the portable apparatus.

The invention will now be described, by way of example only, with reference to the accompanying drawings, in which:

BRIEF DESCRIPTION OF THE DRAWINGS

FIG. 1 shows an example of a portable apparatus, a radiotelephone. The radiotelephone comprises a rear housing 1, a PCB 2, a PCB cover 3, a LCD 4 with a flexible tab connector 5, a speaker 6 and a frame 7 for retaining and connecting the LCD 4 and speaker 6 within the radiotelephone.

Figure 1:
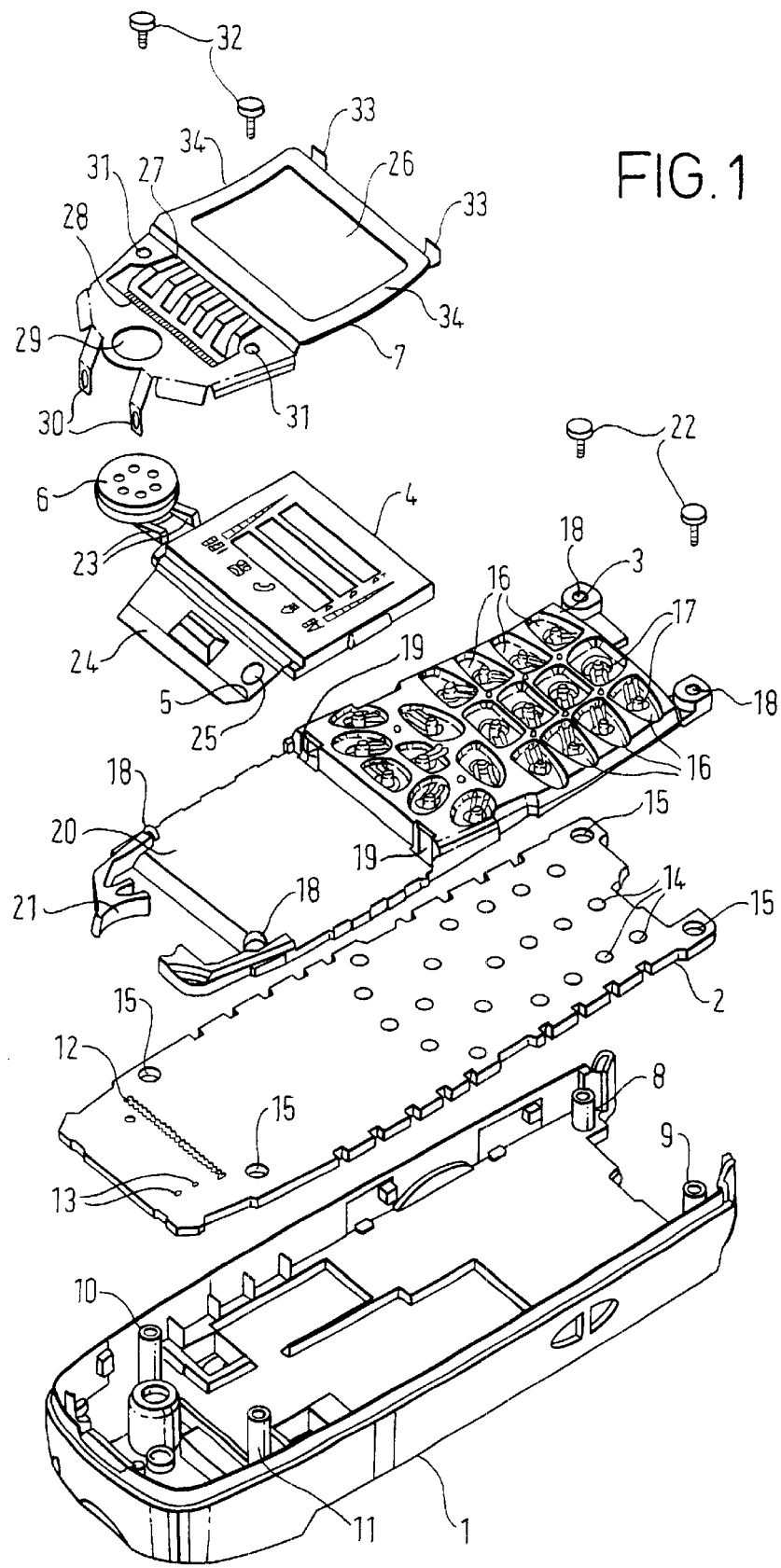
FIG. 1 illustrates an exploded view of a radiotelephone according to one embodiment of the present invention.

The rear housing 1 has four screw bosses 8, 9, 10, 11 extending from the uppersurface of the housing 1.

DETAILED DESCRIPTION OF THE INVENTION

The PCB 2 has surface mounted components connected to the underside (not shown) of the PCB 2. The topside of the PCB 2 has one set of contacts 12 for supplying current to the LCD 4 and a second set of contacts 13 for supplying current to the speaker 6. Switches 14 are mounted on the PCB 2. Pressing a radiotelephone key (not shown) actuates the switches 14. The PCB 2 is designed to fit within the rear housing 1. The PCB 2 has four apertures 15. When the PCB 2 is correctly mounted within the rear housing 1 each aperture 15 is co-axially aligned with a respective screw boss 8, 9, 10, 11. The screw bosses 8, 9, 10, 11 extend away from the upper surface of the rear housing 1 such that when the PCB 2 is correctly mounted on the rear housing 1 the screw bosses 8, 9, 10, 11 project through respective apertures 15. Screw bosses 8, 9, 10 extend through the respective apertures 15 to a point approximately level with the top surface of the PCB 2. Screw boss 11 extends through its respective aperture 15 such that it protrudes above the PCB 2 surface. This is to allow the screw boss 11 to be used as an alignment point for the PCB cover 3 and LCD flexible tab connector 5.

The PCB cover 3 is designed to fit with the upper surface of the PCB 2. The PCB cover 3 has a plurality of apertures 16; each aperture has a resilient element 17 extending into a respective aperture. When the PCB cover 3 is correctly mounted on the PCB 2 the elements 17 are disposed above respective switches 14 so that when a radiotelephone key (not shown) is depressed the key makes contact with an element 17 urging the element 17 into contact with a switch 14, resulting in actuation of the switch 14.

The PCB cover 3 has four apertures 18 for mounting the PCB cover 3 to the housing 1. When the PCB cover 3 is correctly mounted on the rear housing 1 each aperture 18 is coaxially aligned with a respective screw boss 8, 9, 10, 11.

The PCB cover 3 has two cut away sections 19 for mounting the frame 7 to the PCB cover 3. The PCB cover 3 also has a substantially flat section 20 for mounting the display 4 upon. The PCB cover 3 has a speaker section 21 for retaining the speaker 6 so to limit movements of the speaker in the plane of the PCB cover 3.

To secure the PCB cover 3, and correspondingly the PCB 2, to the housing 1 screws 22 are inserted through two of the apertures 18 and screwed into screw bosses 8, 9 respectively.

When the speaker 6 is correctly mounted in the speaker section 21 the speaker contacts 23 are disposed above the PCB speaker contacts 13.

When the LCD 4 is correctly mounted on the display section 20 the LCD flexible tab connector contacts 24 are disposed above the PCB display contacts 12.

The flexible tab connector 5 has an aperture 25 for aligning the flexible tab connector 5. When the LCD 4 is mounted correctly the screw boss 11 extends through aperture 25 of the flexible tab connector 5 to align the flexible tab connector.

The frame 7 has an aperture 26 through which the LCD 4 is viewed. The size of the aperture is smaller than the front face of the LCD 4 such that when the frame is secured to the radiotelephone the frame is capable of retaining the LCD 4. The frame 7 has two mounting elements 33 that are designed to cooperate with the cut away sections 19 to allow pivotal movement of the frame 7.

The frame is made of resilient material and the two sections 34 of the frame next to the aperture which run along the longitudinal section of the housing 1 are slightly curved. When the frame is mounted correctly, which is described in detail below, the frame retains the LCD 4 to the PCB cover 3 with the curved sections 34 of the frame resiliently biased against the LCD 4 to retain the LCD 4 on the display section 20 and allow the absorption of shock.

The frame has a resilient element 27 comprising a number of resilient fingers 28. The number of resilient fingers 28 corresponds to the number of flexible tab contacts 24 and consequently the number of PCB display contacts 12. When the frame 7 is mounted correctly each resilient fingers 28 is disposed above a flexible tab contact 24, and correspondingly above a respective PCB display contact 12. The fingers 28 are resiliently biased against the flexible tab connector 5 to urge the PCB contacts 12 and flexible tab contacts 24 together.

The display contacts 12 are mounted on the underside of the flexible tab connector 5, which is made of a flexible insulating material. Therefore, the fingers 28 do not make electrical contact with the display contacts 12.

It will be appreciated by a person skilled in the art that a single resilient element could be used for a plurality of contacts.

The frame 7 has a further aperture 29 having a diameter slightly smaller than the speaker 6 diameter so that when the frame is mounted correctly, which is described in detail below, the frame 7 retains the speaker to the PCB 2 and the speaker contacts 23 and PCB speaker contacts 13 are urged together.

The frame has two retaining elements 30 such that when the frame 7 is mounted the elements can be bent over an edge of the PCB 2 to allow the frame 7 to be secured to the PCB 2. This is to ensure that sufficient pressure is applied to the LCD 4 and speaker 6 to keep them in place within the radiotelephone and that the LCD contacts 24 and the speaker contacts 23 maintain a good connection with the PCB contacts 13.

Optionally, the frame has two mounting apertures 31. When the frame 7 is mounted correctly the apertures 31 are coaxially aligned with screw bosses 10, 11. Screws 32 are inserted through respective apertures 31 and screwed into screw bosses 10, 11.

The mounting of the frame will now be described with reference to FIGS. 2 to 4.

Figure 2:
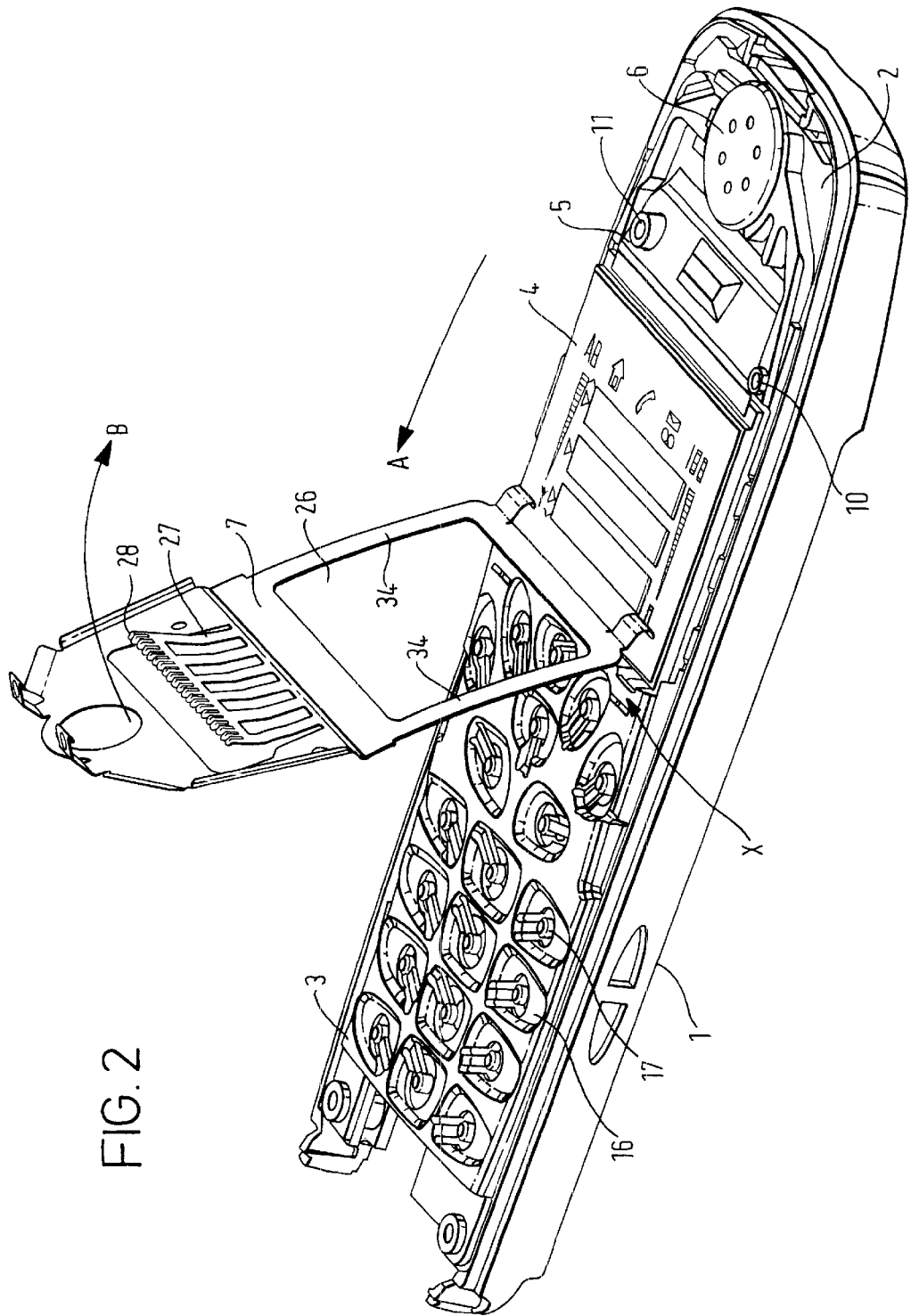
FIGS. 2 to 4 show the operation of the connector arrangement according to one embodiment of the present invention.
Figure 3:
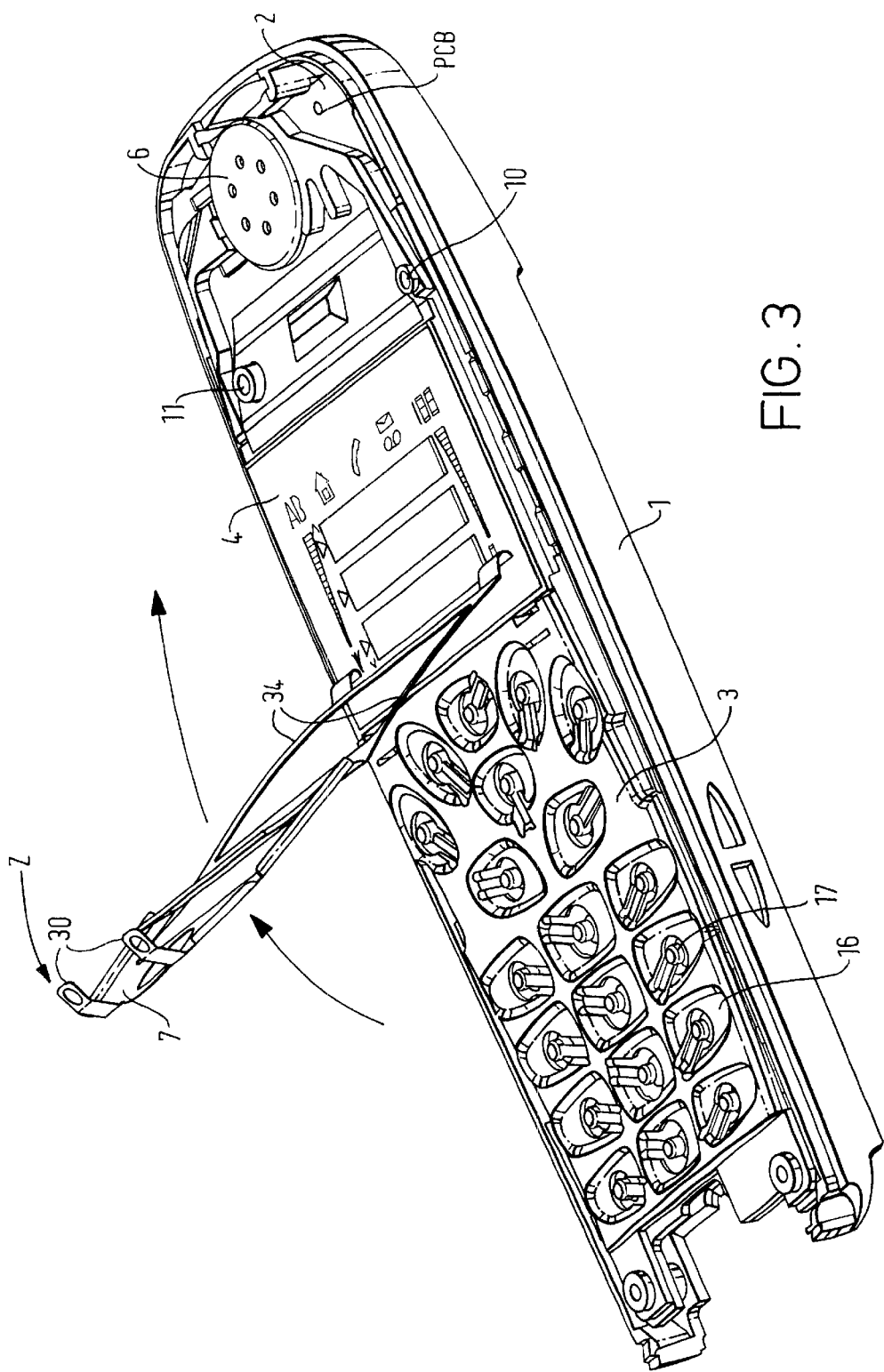
Figure 4:
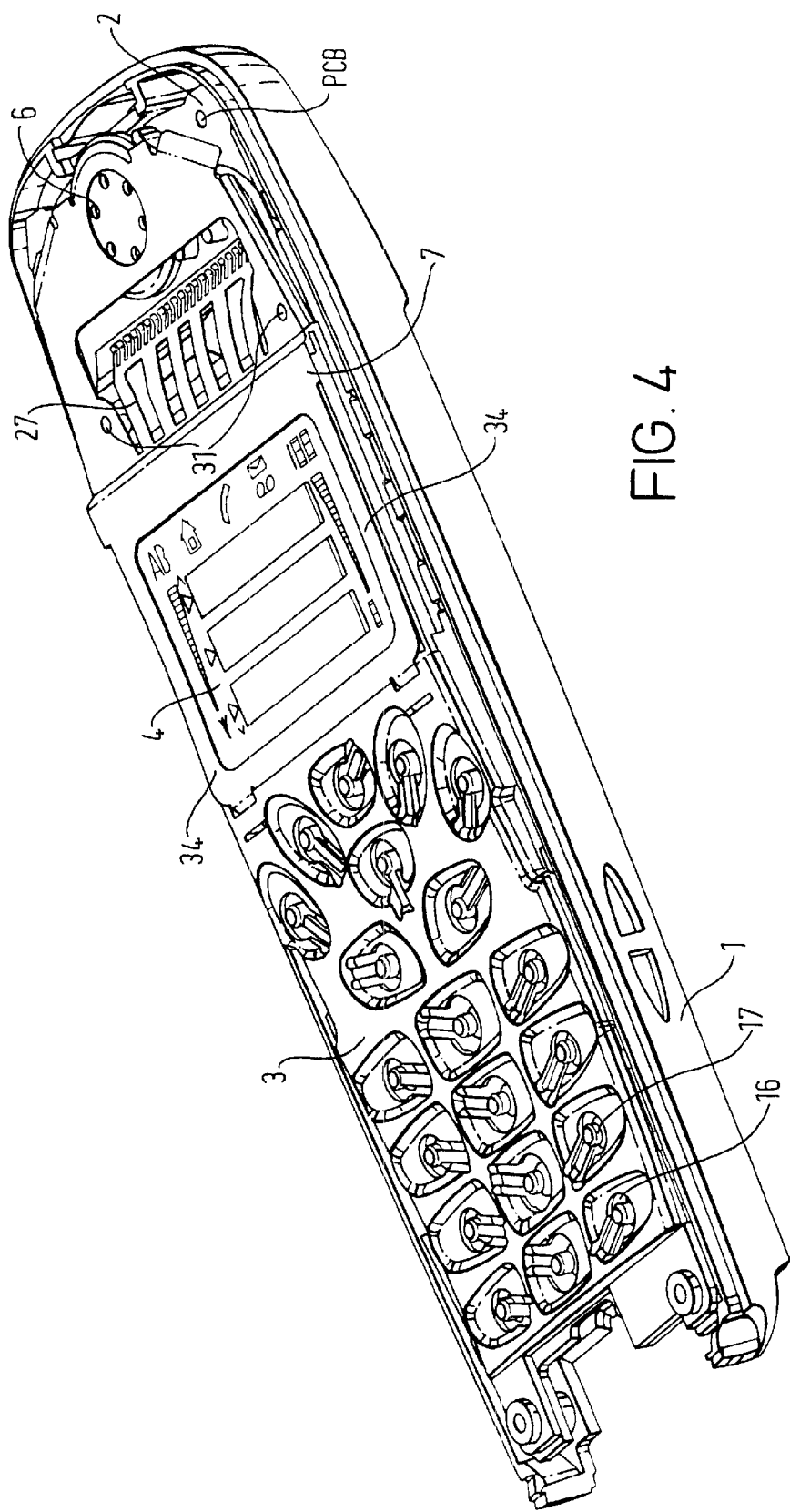

FIGS. 2 and 3 show the radiotelephone with the PCB cover 3 connected to the housing 1. The LCD 4 is mounted on the PCB mounting section 20 of the PCB cover 3 with the screw boss 11 inserted through the flexible tab connector aperture 25. The speaker 6 is mounted on the PCB 2 and the frame 7 placed in the vertical position with the two mounting elements 33 inserted in respective cut away sections 19.

The frame 7, as shown in FIG. 2, is pivoted towards the speaker 6 and about an axis in the X direction until the frame comes to rest on the LCD 4. As a result of the curved sections 34 along the aperture 26 the lower part of the frame 7 lies in contact with the LCD while the upper part of the frame 7 is biased away from the LCD 4 and speaker 6. The top of the frame 7 is urged towards the PCB 2 until the retaining elements 30 can be latched under the PCB. This step can be performed manually or automated on a production line. As the top part of frame 7 is moved towards the PCB 2 the resilient element 27 and correspondingly the fingers 28 are urged against the flexible tab connector 5. As a result the flexible tab connector contacts 24 and the PCB contacts 12 are urged together as shown in FIG. 4. Optionally, screws 32 can then be screwed into screw bosses 10, 11 respectively. The frame 7 is design to ensure that sufficient force is applied to the flexible tab connector, when the frame is mounted, to ensure that an adequate connection is made between the PCB contacts 12,13 and the contacts 24, 23.

However, a person skilled in the art would appreciate that the frame 7 could be mounted to the PCB 2 by other means, for example the frame 7 could be latched to the PCB 2.

In view of the foregoing description it will be evident to a person skilled in the art that various modifications may be made within the scope of the invention. For example, it will be appreciated that the frame could be used solely for connecting the LCD 4 to the PCB 2.

What is claimed is:

1. Portable apparatus comprising a display having an electrical interface with at least one electrical contact; a circuit board having an electrical interface with at least one electrical contact for supplying current to the display and an integral frame for securing the display to the portable apparatus and for urging the display contact and circuit board contact together to allow current to flow from the circuit board contact to the display contact, wherein the frame has a first section for securing the display to the portable apparatus and a second section of urging the display contacts and circuit board contacts together and the first section is resiliently biased against the display to allow absorption of shock.

2. Portable apparatus according to claim 1, wherein the second section comprises a resilient element.

3. Portable apparatus according to claim 2, wherein the resilient element has a plurality of resilient fingers.

4. Portable apparatus according to claim 1, wherein the frame is pivotally mounted to the portable apparatus to allow movement between an open position and a closed position such that when the frame is in the open position the display can be positioned on or in the portable apparatus and when the frame is in the closed position the display can be secured to the portable apparatus and the display contact and circuit board contact can be urged together.

5. Portable apparatus according to claim 4 comprising retaining means for retaining the frame in the closed position.

6. Portable apparatus according to claim 1, further comprising a speaker having an electrical contact, the frame being capable of securing the speaker to the portable apparatus and urging the speaker contact and a circuit board contact together to allow current to flow from the circuit board contact to the speaker contact.

7. Portable apparatus according to claim 1 wherein the apparatus is a radiotelephone.

8. An integral frame for mounting a portable apparatus for retaining and electrically connecting a display to the portable apparatus, the frame comprising a first section for securing the display to the portable apparatus and a second section for urging together the electrical contacts of the display and electrical contacts of the portable apparatus together to allow current to flow from the portable apparatus contacts to the display contacts, and wherein the first section is resiliently biased against the display to allow absorption of shock.

9. A frame according to claim 8, wherein the second section comprises a resilient element.

10. A frame according to claim 9, wherein the resilient element has a plurality of resilient fingers.

11. A frame according to claim 8, wherein the frame is pivotally mountable to the portable apparatus to allow movement between an open position and a closed position such that when the frame is in the open position the display can be positioned on or in the portable apparatus and when the frame is in the closed position the display can be secured to the portable apparatus and the display contact and portable apparatus contact can be urged together.

12. A frame according to claim 11 comprising retaining means for retaining the frame in the closed position.

13. A frame according to claim 8, further comprising a third section for securing a speaker having an electrical contact to the portable apparatus and urging the speaker contact and a portable apparatus contact together to allow current to flow from the portable apparatus contact to the speaker contact.

14. Portable apparatus comprising a display having an electrical interface with at least one electrical contact; a circuit board having an electrical interface with at least one electrical contact for supplying current to the display; and an integral frame having a section which, in use, is resiliently biased against the display to allow absorption of shock and for securing the display to the portable apparatus.

* * * * *